Dec. 14, 1943. J. H. VAN UUM 2,336,656
SNAP FASTENING DEVICE FOR ANCHORING CONDUITS AND THE LIKE
Filed March 30, 1942

INVENTOR.
JOHN H. VAN UUM
BY
John H. Leonard
his attorney

Patented Dec. 14, 1943

2,336,656

UNITED STATES PATENT OFFICE 2,336,656

SNAP FASTENING DEVICE FOR ANCHORING CONDUITS AND THE LIKE

John H. Van Uum, Lakewood, Ohio

Application March 30, 1942, Serial No. 436,824

11 Claims. (Cl. 285—174)

This invention relates to a snap fastening device, and particularly to a snap fastening device for anchoring insulated electric wire in installed position in fittings such as distributor heads, condensers and suppressors for engine spark plug connections, wherein the wire or conduit is inserted endwise into a tubular portion of the fitting for making an electrical contact between the end of the wire and an electrical contactor within the fitting.

Usually such fittings have a tubular portion of hard rubber or other insulating material which is closed at one end and open at the other, a metal contactor embedded in the fitting being exposed in the inside of the tubular portion at the closed end and, through other means carried by the fitting being adapted to be connected to a spark plug and the like.

The usual connection is effected by inserting the insulated wire into the tubular portion which is made to accommodate it snugly, the bare wire being exposed at the end of the insulation for contact with the contactor at the base of the tubular portion.

Heretofore for holding the wire firmly in place, a flexible rubber shield has been used, the shield fitting tightly about the wire and over the end of the fitting. Such devices form a satisfactory connection when originally installed, but they soon become loose and unreliable due to deterioration of the rubber to such an extent that the shields no longer grip tightly on the insulated wire and particularly on the tubular portion of the fitting.

One of the objects of the present invention is to provide a device capable of more positively anchoring an insulated wire to the fitting when the insulated wire is installed.

Another object is to provide a snap fastener for this purpose which will not deteriorate and which will retain its holding power indefinitely.

Still another object is to provide a snap fastener in which the gripping power is increased when a stress is placed on the insulated wire tending to pull it out of the fitting.

Another object is to provide a fastening device of this character which may be readily installed on the fitting before the wire is installed in the fitting and which operates so that the wire subsequently can be installed and become anchored merely by inserting it in the fitting in the usual manner.

Other objects and advantages will become apparent from the following specification, wherein reference is made to the drawing in which.

Figure 1:
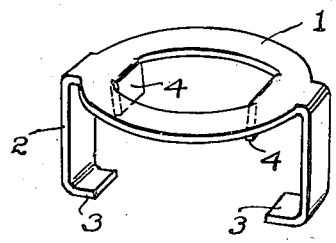
Fig. 1 is a perspective view of a snap fastener embodying the principles of the present invention.

Referring to Fig. 1, the preferred embodiment of the snap fastener comprises a single piece of flat spring metal having a head portion 1 in the form of an annulus having at its outer margin diametrically opposite resilient portions or legs 2 which extend generally parallel to the axis of the annular head. The free ends of the legs are inturned toward the axis of the annulus to provide locking shoulders 3 which are spaced from and face toward the head 1.

On the inner margin of the head, in alignment with, or if desired, at 90° from the plane of the legs 2, are resilient anchoring means or gripping fingers 4. The fingers 4 extend from the head portion 1 generally parallel to the legs, but converge in a direction away from the head. The outer diameter of the head portion 1 is preferably equal to the outer diameter of the tubular fitting with which the fastener is to be associated and the inner diameter is preferably of a size to snugly fit the insulated wire to be anchored.

Figure 2:
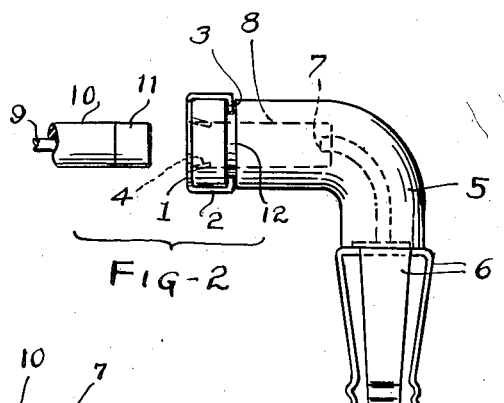
Fig. 2 is a side elevation of a fitting with the snap fastener installed thereon and the wire in position for insertion.

The installation of the fastener on a fitting is illustrated in Fig. 2. The particular fitting chosen for purposes of illustration comprises a suppressor 5 of hard rubber or suitable insulating material which carries contacting arms 6 for connection to a spark plug, the arms 6 being connected in any suitable manner internally of the fitting with an electrical conduit which has a contact end 7. The fitting 5 is generally tubular in form at the portion which is to receive the wire, thus providing a cylindrical cavity 8 in which the wire is snugly accommodated. The contact end 7 is exposed in the inner end or base portion of the cavity 8 for purposes of contact with the end of the wire to be anchored to the fitting. The wire 9 is one customarily used and provided with the usual insulation 10 which may be rubber of a suitable composition, and covered with woven material or the like if desired. Usually a spud or a cap 11 is fastened over the end of the wire to prevent fraying of the insulation at the end, the cap being of conducting material and fastened to or in contact with the wire 9.

For the purposes of installing the fastener, the fitting has an external groove or notch 12 extending entirely around its circumference a proper distance from the end so that when the head 1 lies against the end of the fitting, the locking shoulders 3 can be accommodated in the groove 12. The fingers 4 are so arranged that at their juncture with the head 1 they lie against the wall of the cavity 8. The fastener is installed merely by spreading the legs 2 and forcing the fastener down over the end of the fitting, legs foremost, until the shoulders 3 snap into the groove 12 and anchor the fastener with the head firmly against the end of the fitting and centered with respect thereto by the fingers 4. By this connection, due to the spring tension of the fastener, the fastener cannot be removed except by pulling radially outwardly on the legs 2 so as to spread them and lift the shoulders 3 out of the groove 12.

Figure 3:
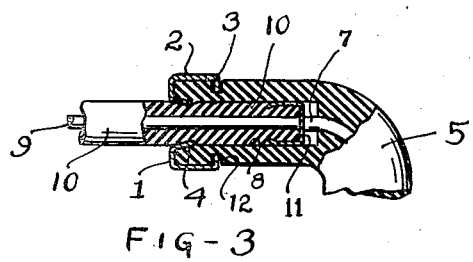
Fig. 3 is a fragmentary longitudinal section view showing the wire installed in the fitting and anchored therein by the snap fastener.

To install the wire, the latter is merely forced through the opening in the head 1 until the end of the cap 11 is in firm contact with the contact end 7. As the wire is forced into the cavity 8, the fingers 4 are spread apart by the wire and due to their inherent resiliency press inwardly firmly against the wire to such an extent that any attempt to withdraw the wire causes the fingers to act as spring pawls and dig into the insulation slightly, as best illustrated in Fig. 3, thus firmly anchoring the wire in position against return movement.

As mentioned, while the fingers 4 lie generally in the diametral plane of the legs, they may be disposed in a diametral plane at right angles to the plane through the legs, so as to better assist in preventing removal or dislocation of the fastener from the fitting by movement in a direction transverse to the axis of the cavity 8. Usually, however, the fingers 4 fit so closely that this right angular disposition is unnecessary to prevent removal of the fastener.

The fact that the fastener can be readily installed on the fitting prior to the installation of the wire in the fitting is a distinct advantage in the field as the wire can be inserted in the same manner as heretofore; that is, merely by pushing it into the fitting until contact is made.

Figure 4:
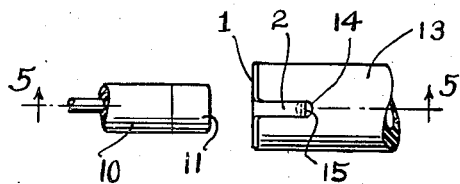
Fig. 4 is a fragmentary side elevation illustrating a modification of the invention.
Figure 5:
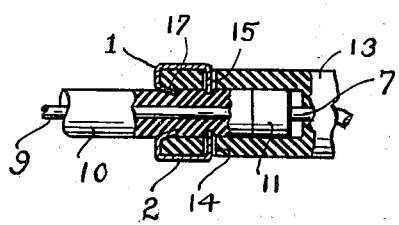
Fig. 5 is a longitudinal sectional view of the modified form of structure illustrated in Fig. 4.

Referring to Figs. 4 and 5, the fastener is shown in a modified construction in which the fitting 13 is provided with a pair of opposite and aligned apertures 14 extending entirely through the side walls into the inner cavity. In this form the fastener is installed in the same manner but the shoulders 15 of the fastener, corresponding to the shoulders 3 above described, may be of sufficient length so that they also engage the insulated wire and press slightly into the insulation 10.

In installing the device on a fitting of this character, the legs 2 are held slightly spread so that the ends of the shoulders 15 do not project into the cavity and the wire 17 is then installed to the seated position after which the legs are released and the ends of the shoulders 15 may engage the insulation. The fingers 17 operate in the same manner as the fingers 4 of the first described form.

This particular type of construction is extremely effective because any longitudinal pull on the wire is resisted not only by the shoulders 15 engaging the insulation and being locked thereby in the apertures 14 but also by the fingers 17. To remove the fastener it is necessary to spread the legs apart sufficiently to free the shoulders 15 from the fitting and remove the wire and fastener together from the fitting.

While I have shown and described a preferred embodiment of my invention, it is to be understood that structure may be modified and may be used to anchor conduits, copper tubing and the like. The word "conduit" is used in the claims to include not only the insulated wire but other electric conduits, copper tubing, or any member to be anchored into such a fitting.

Having thus described my invention, I claim:

1. A fastener comprising a head portion with an opening therethrough, means on the head for securing the fastener to a support, spring pawl means on the head adjacent the opening and having gripping shoulder portions directed generally axially of the opening and normally lying within the axially projected peripheral limit of the opening at a location spaced from the head and spaced apart from each other transversely of said projected limit, and said gripping shoulder portions being capable of flexure in a radial direction outwardly of said projected limit.

2. A fastener comprising a head portion with an opening therethrough, means on the head extending in one direction along the axis of the opening for detachably securing the fastener to a support, a spring pawl on the head adjacent the opening and extending from the head generally in the same direction as the securing means for preventing movement, in one direction only along said axis, of a member adapted to be passed through said opening.

3. A snap fastener for the purposes described and comprising a head having an opening therethrough, snap fastening means on the head in spaced relation to each other and spaced outwardly of the head from the opening, additional snap fastening means on the head in spaced relation to each other and in inwardly spaced relation from the first means and having locking portions normally lying within the axially projected peripheral limit of the opening at a location spaced from the head, said additional snap fastening means being resilient and capable of flexure out of said projected limit.

4. A fastener comprising a head having a central opening adapted to afford passage of a conduit therethrough, resilient spaced legs on the head extending generally parallel to the axis of the opening and having gripping shoulders in spaced relation to and facing toward the head, and resilient fingers on the head adjacent the opening and extending generally parallel to the legs, said fingers being relatively convergent in a direction away from the head and having abrupt shoulders at their free ends operative as pawl shoulders to prevent movement of such conduit in one direction axially of the opening.

5. A snap fastener for the purposes described and comprising a single piece of flat spring metal having one portion in the form of an annular head and having portions in the form of relatively spaced legs extending from the outer margin of the head in a direction generally parallel to the axis of the annular head, said legs having inturned portions in spaced relation to the head and providing locking shoulders, said piece of metal having portions in the form of relatively spaced gripping fingers extending from inner marginal portions of the head generally in the same direction as the legs, and said fingers being convergent in a direction away from the head.

6. In a connection in which a conduit is received through an open end of, and is accommodated within, a tubular fitting, a snap fastener for anchoring the conduit more effectively in installed condition in the fitting and said snap fastener having a head portion adapted to overlie the end of the fitting, resilient snap fastening means extending from the head portion in a position to lie alongside the fitting externally thereof when the fastener is installed and arranged for snap fastening engagement with the fitting, said fastener having an opening adapted for alignment with the opening in the fitting when the fastener is installed thereon, means on the fitting extending from the head portion into a position to lie within the cavity in the fitting and closely adjacent and along the inner wall of the fitting when the fastener is installed, said last named means being operative resiliently to oppose insertion of the conduit through the fastener into the fitting while enabling insertion thereof and to return toward normal position when the conduit is installed in the fitting and thereby engage the conduit for resisting withdrawal thereof.

7. The combination with a tubular fitting having an open end and a conduit received in the tubular fitting through the open end, of snap fastening means having a portion operative for snap fastening engagement with the tubular fitting and another portion extending into the interior of the fitting and operative therein for yielding engagement with the conduit in a manner to block movement of the conduit axially of the tubular fitting in one direction only, whereby the conduit and tubular fitting are secured together.

8. In combination, a tubular fitting adapted to receive a conduit endwise, a snap fastener secured to said fitting, resilient snap fastening means carried on the fastener and extending into the interior of the tubular fitting and normally spaced apart a distance less than the diameter of the conduit to be received in the fitting, said last named means being operative to be spread apart and permit insertion of the conduit endwise into the fitting and to return toward normal position for engaging and anchoring the conduit against withdrawal when the installed conduit is urged in a direction for removal from the fitting.

9. In combination, a tubular fitting adapted to receive a conduit endwise, a fastener at one end of the fitting, circumferentially spaced spring legs on the fastener adapted to extend along the fitting and having inwardly turned fingers, openings in the wall of the fitting positioned to receive the fingers, said fingers extending inwardly beyond the inner peripheral surface of the fitting so as to bear against the conduit.

10. In combination, a tubular fitting adapted to receive a conduit endwise, a fastener at one end of the fitting, a resilient pawl carried on the fastener and extending into the interior of the tubular fitting in position to lock such conduit against movement out of the interior of the fitting in one direction, circumferentially spaced spring legs on the fastener adapted to extend along the fitting and having inwardly turned fingers, the wall of the fitting having transverse openings therein positioned to receive the fingers.

11. In combination, a tubular fitting adapted to receive a conduit endwise, a fastener at one end of the fitting, a resilient pawl carried on the fastener and extending into the interior of the tubular fitting in position to lock such conduit against movement out of the interior of the fitting in one direction, circumferentially spaced spring legs on the fastener adapted to extend along the fitting and having inwardly turned fingers, the wall of the fitting having transverse through openings therein positioned to receive the fingers, said fingers extending inwardly through respective openings beyond the inner peripheral surface of the fitting so as to bear against the conduit.

JOHN H. VAN UUM.